United States Patent [19]
Carlson

[11] 3,784,012
[45] Jan. 8, 1974

[54] SEPTIC TANK CONSTRUCTION
[76] Inventor: Henry B. Carlson, 95 Broadview Ave., Kings Park, N.Y.
[22] Filed: Mar. 31, 1972
[21] Appl. No.: 240,138

[52] U.S. Cl.................. 210/170, 210/261, 210/532
[51] Int. Cl. ............................................. C02c 1/14
[58] Field of Search....................... 210/62, 63, 170, 210/195, 207, 220, 232, 261, 513, 519, 532 S, 532–536, 542

[56] References Cited
UNITED STATES PATENTS

| | | | |
|---|---|---|---|
| 2,796,176 | 6/1957 | Monson | 210/533 X |
| 3,097,166 | 7/1963 | Monson | 210/532 X |
| 3,451,553 | 6/1969 | Davis | 210/170 |
| 2,595,923 | 5/1952 | Carlson | 210/542 |
| 3,240,343 | 3/1966 | Werner | 210/532 X |
| 3,057,796 | 10/1962 | Davis | 210/532 X |
| 2,482,870 | 9/1949 | Price | 210/542 |
| 1,607,280 | 11/1926 | King | 210/533 X |

FOREIGN PATENTS OR APPLICATIONS 543,099  12/1925  Germany ........................... 210/533

Primary Examiner—Samih N. Zaharna
Assistant Examiner—Robert H. Spitzer
Attorney—Jacobs & Jacobs

[57] ABSTRACT

Precast concrete septic tank constructions and their assembly with leaching pools are disclosed wherein important economies in construction are obtained as well as improved efficiency and better access. In its preferred form the septic tank is supported inside the leaching pool from the top of the wall thereof, the wall being made of sanitary drain rings which provide rows of apertures for diffusion of effluent into the surrounding earth.

5 Claims, 9 Drawing Figures

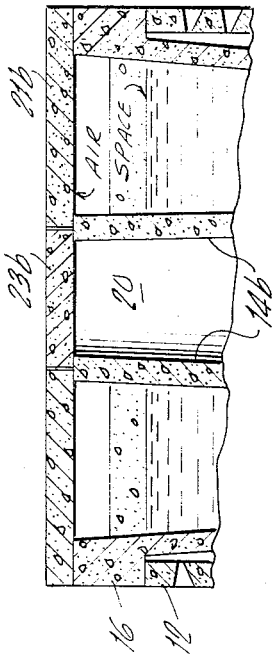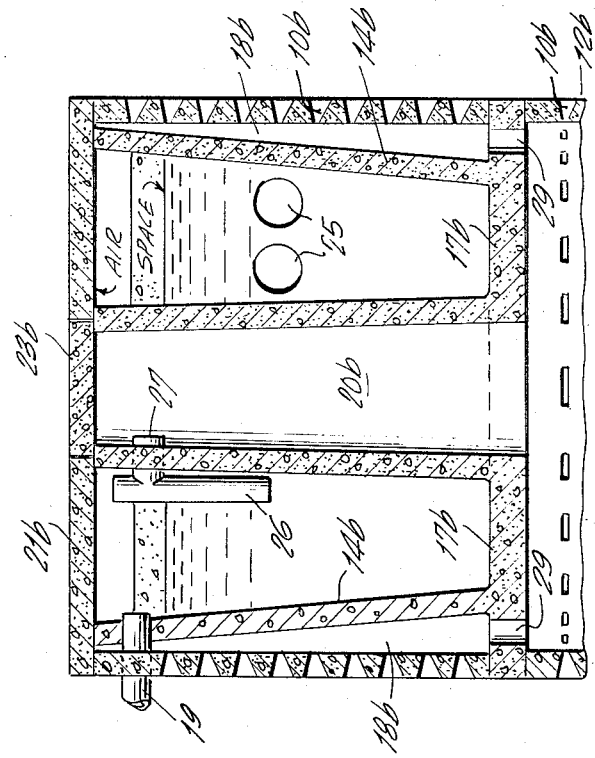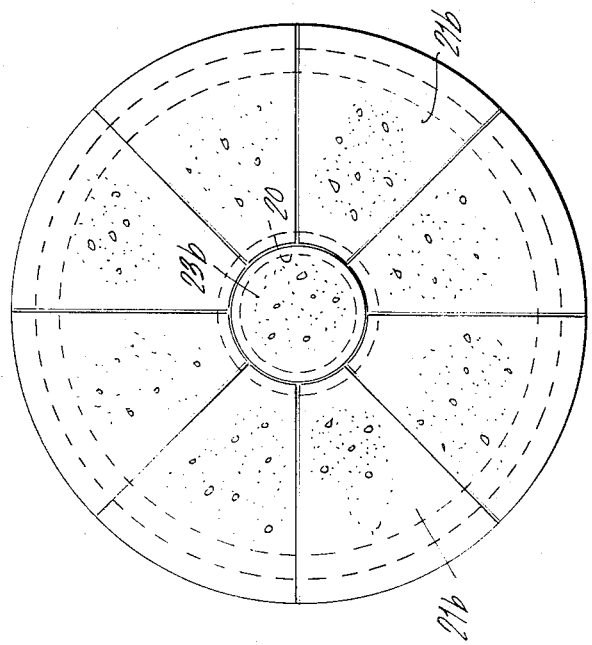

the leaching pool below the septic tank,

SEPTIC TANK CONSTRUCTION

BACKGROUND OF THE INVENTION

A septic tank is in effect a settling basin which serves to retard the flow of sewage until solid matter settles to the bottom. These solids are broken up by the action of anerobic bacteria which develop and thrive in the septic tank. They digest the solids into gases, sludge and soluble products. The effluent is usually piped into leaching pools or fields. Precast concrete is accepted as the best material for septic tanks and leaching pools and other sewage disposal units, particularly since it becomes harder and stronger with age. It is non-corrosive and resistant to the harmful elements in sewage.

THE PRESENT INVENTION

The present invention relates to a new and improved septic tank construction of reduced cost and increased efficiency and which is adaptable to a wide range of sizes and capacities. In its preferred form the septic tank is made of precast cement hung from the upper surface of the wall of a leaching pool and extending down into the leaching pool. The septic tank is provided with an inlet and outlet so arranged that the path from the inlet to the outlet is unusually long thereby providing more prolonged treatment of the sewage and better settling. The septic tank has a central access shaft and a concrete slab resting on the tank with a central opening provided with a removable cover giving access to the access shaft.

The invention is illustrated in the accompanying drawings, in which:

FIGS. 7 to 9 show a still further modified form of the invention both in its construction and in its relationship to the leaching pool.

Figure 1:
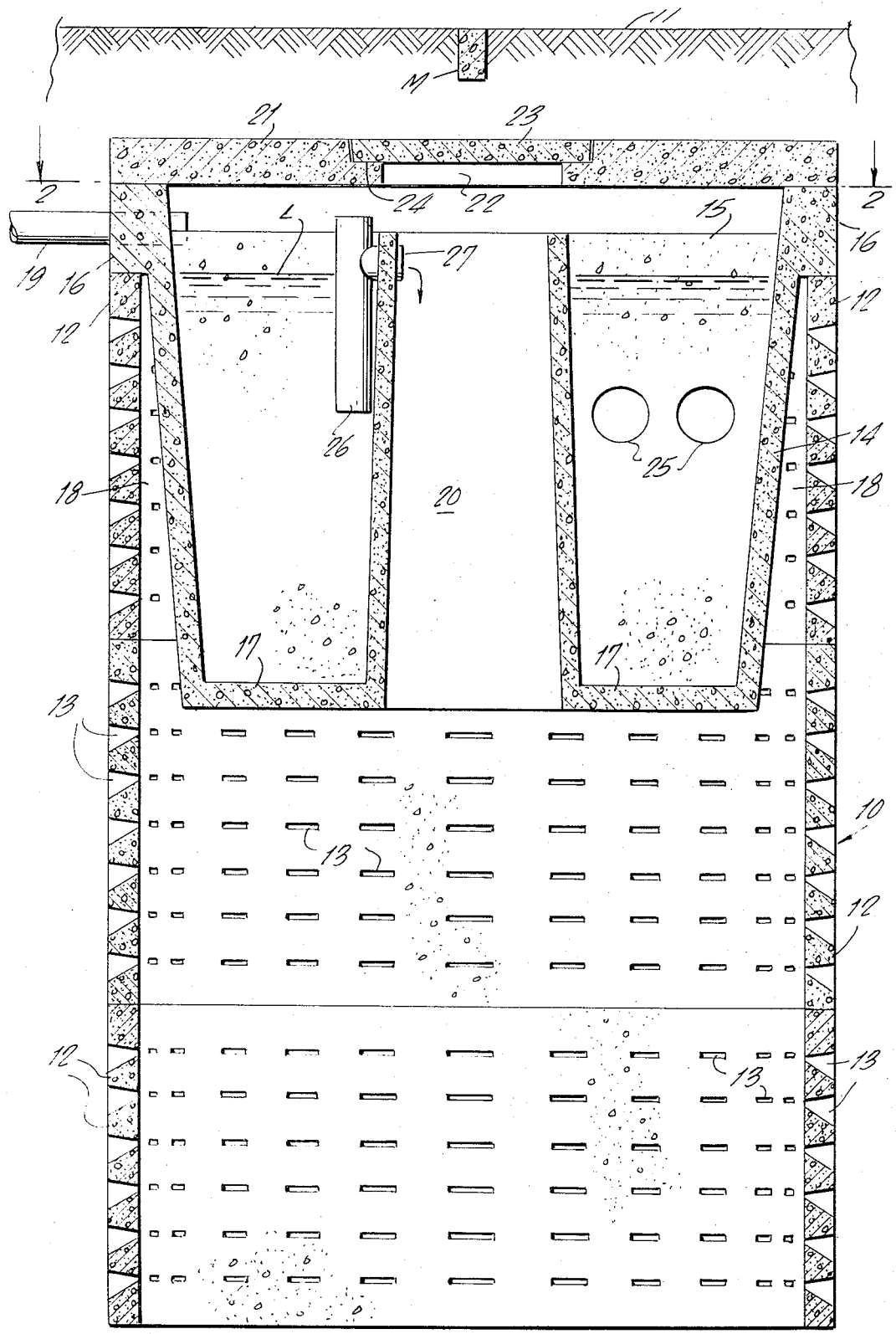
FIG. 1 is a sectional elevation of the preferred septic tank construction according to the invention.
Figure 2:
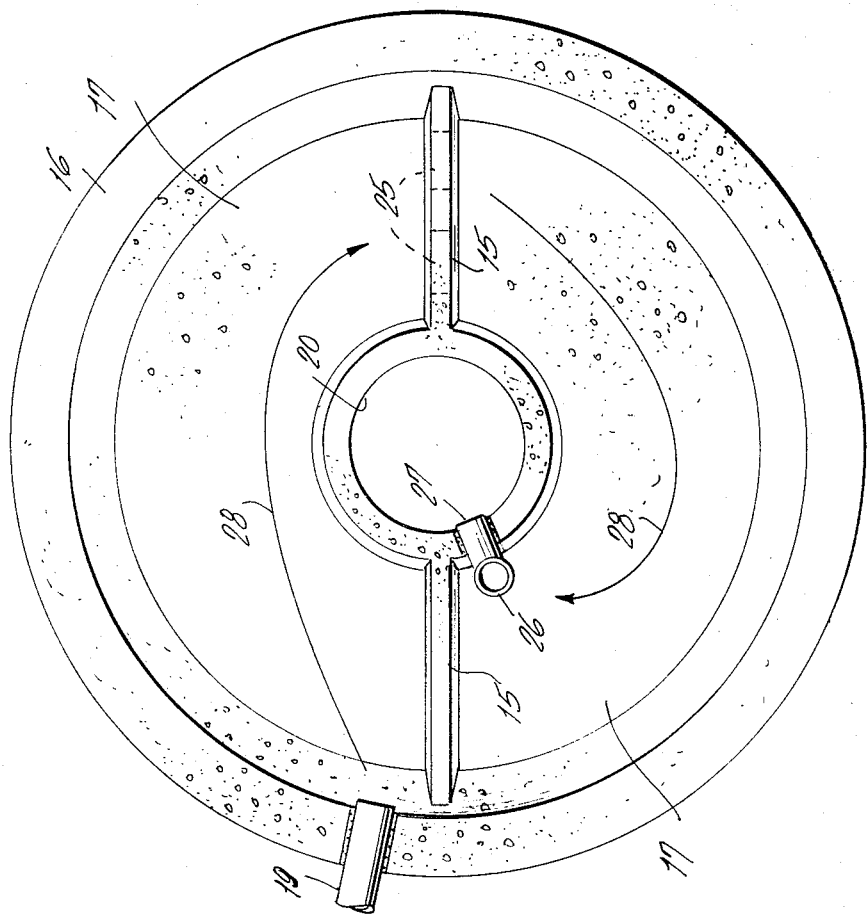
FIG. 2 is a view taken on line 2—2 of FIG. 1.

Referring to FIGS. 1 and 2, the leaching pool 10 which is disposed below ground level 11 (and located by marker M) as shown is formed from a plurality of sanitary drain rings 12 of precast concrete which are generally of trapezoidal cross-section thereby providing vertical spaced horizontal rows of effluent openings 13 which permit seepage or diffusion of effluent into the surrounding earth. The leaching pool may vary in size depending on the particular installation and the required capacity which depends primarily upon the construction of the building which it serves. These sizes and capacities are usually prescribed by the particular community involved.

The septic tank 14 is likewise formed from precast concrete and itself has a predetermined capacity which may for example range from 600 gallons to more than 18,000 gallons although the question of size and capacity is not a limitation on the invention. The septic tank 14 is provided with a diametrically disposed baffle wall 15 and the upper opposite edge portions 16 of the septic tank which may be circular, rectangular or any other desired shape have a thickened portion which rests on the uppermost drain ring 12 and is thus hung or supported by thickened portions 16 as will be observed and in the preferred form of the invention the septic tank tapers downwardly somewhat to its bottom 17 thereby leaving a space of generally triangular shape 18 between the wall of the septic tank and the inner surface of the leaching pool. This has the effect of improving treatment of the sewage or other material entering the system through the inlet pipe 19 which is connected to any source of sewage or material to be discharged into the septic tank and normally is connected to the plumbing or related piping of a residence or industrial building.

It will further be noted that the septic tank 14 is so constructed as to provide a central space herein termed an access shaft 20 which access shaft extends from the top of the baffle wall 15 and down into communication with the leaching pool. It will still further be noted that a concrete slab 21 rests upon the portions 16 of the septic tank and is provided with a central or axial opening 22 which is closed by a removable cover 23 resting on a recessed shoulder or chamfer 24 of the slab 21. One compartment or section of the septic tank 14 is provided with one or more holes 25 in its wall and the other side of the septic tank has adjacent its upper wall portion a short length of vertical tubing 26 having a lateral extension 27 extending through the wall of the septic tank to the access shaft. It will thus be appreciated that as the sewage or material to be processed enters inlet pipe 19 it fills the septic tank and when the level L rises above the holes 25 (but below 27) the material flows through said holes and up through tubing 26 and then through lateral extension 27 and thereafter down the access shaft into the leaching pool from which it gradually seeps or diffuses into the surrounding earth. The provision of the slab 21 with a removable cover 23 enables ready access to the access shaft 20 for visual inspection or cleaning and the entire system as described is exceptionally simple, inexpensive and effective. The inlet-outlet relationship also provides an unusually long flow path 28 as will be apparent from FIG. 2.

Figure 3:
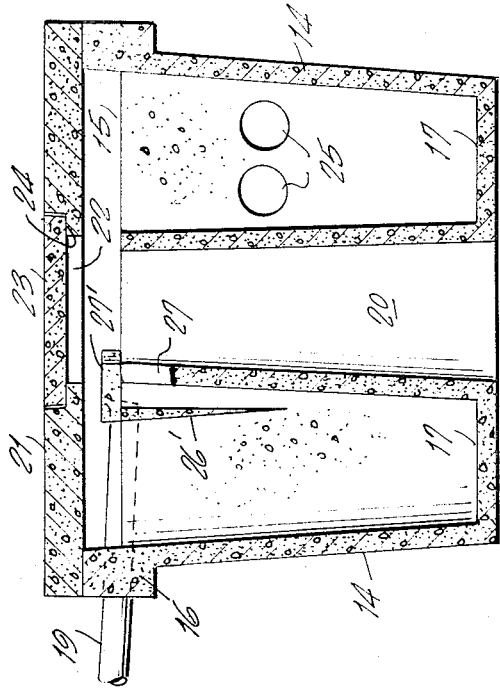
FIG. 3 is a sectional elevation of a modified form of septic tank with the inlet and outlet in tee-shape.
Figure 4:
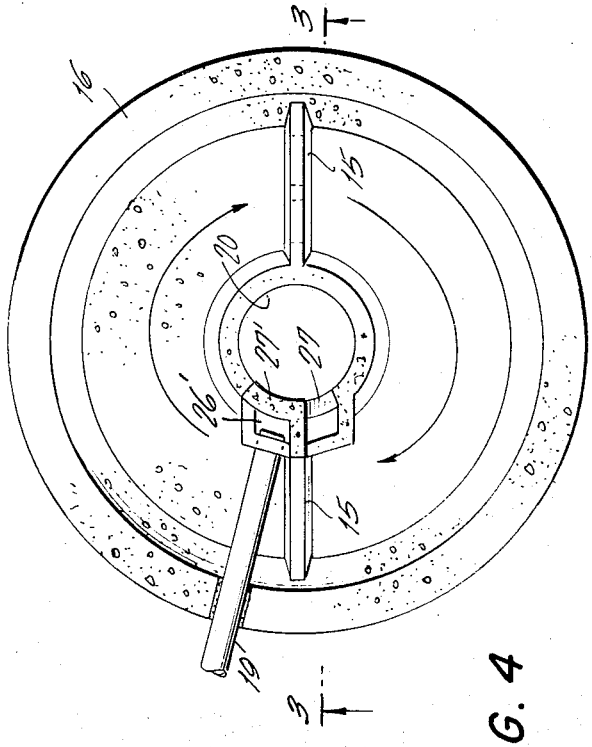
FIG. 4 is a plan view of FIG. 3 without the top slab.

In the modified form of the invention shown in FIGS. 3 and 4, the inlet 19 and outlet 26' portions of the septic tank 14 are re-arranged and made in a tee-formation as shown. In other respects this form of septic tank is essentially the same as in FIG. 1 as will be noted from the use of like numerals.

Figure 5:
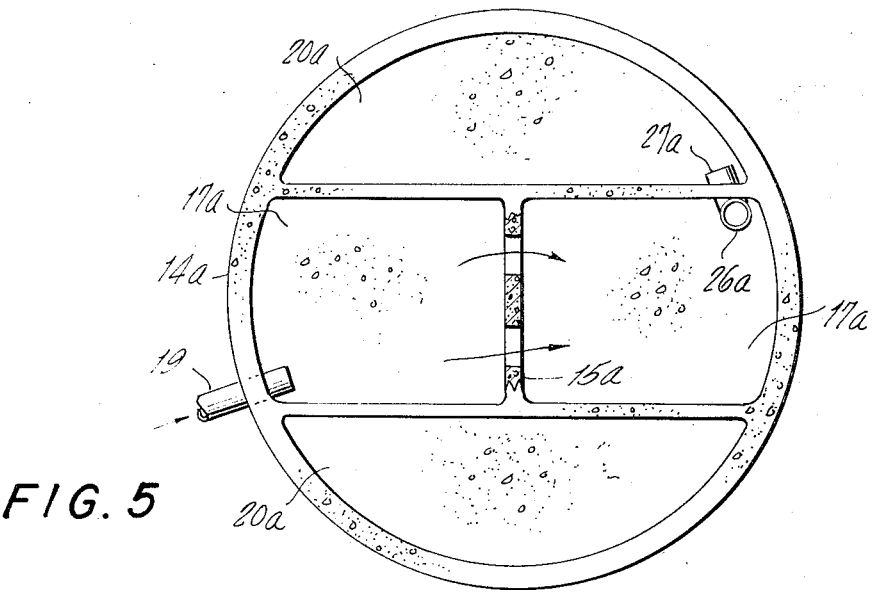
FIGS. 5 and 6 are respectively top and side elevational views of a further modified form of the invention.
Figure 6:
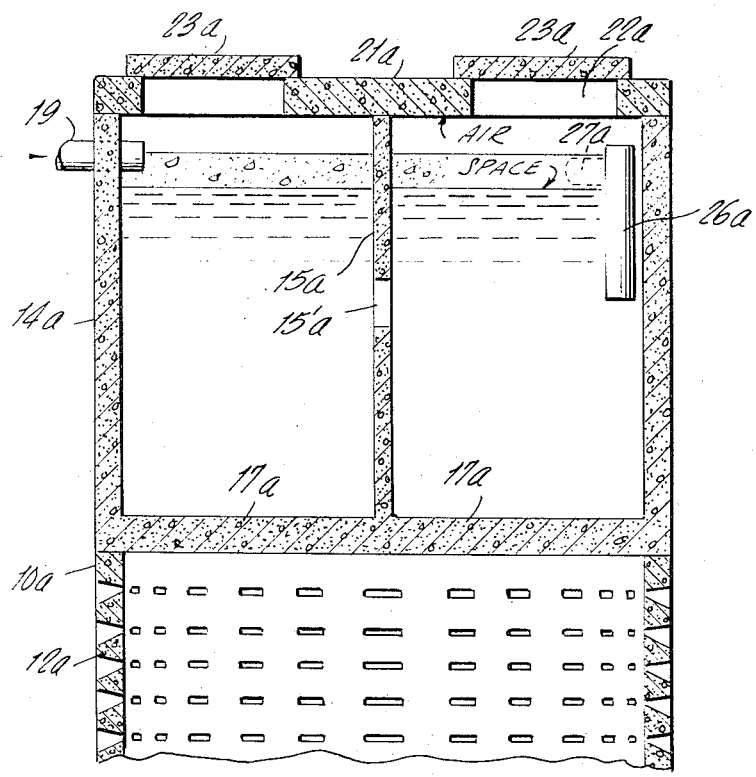

In the further modified form of the invention shown in FIGS. 5 and 6, the septic tank 14a rests on top of the leaching pool wall 10a instead of being hung therefrom and also the septic tank has a central baffle or partition 15a which divides the septic tank into compartments whereby the sewage flows from inlet 19 to the first septic tank compartment and then through aperture 15a', as shown by the directional arrows in FIG. 5, into the other septic tank compartment and then via 26a and 27a to the leaching pool below. Furthermore, the top slab 21a has two openings 22a and two removable covers 23a so that there can be ready access to each compartment of the septic tank.

In the form of the invention shown in FIGS. 7 to 9, the septic tank 14b is made with a somewhat modified bottom closure 17b which extends to and becomes integral with the leaching pool wall 10b and holes 29 are formed in the bottom closure 17b to provide communication between the triangular effluent spaces 18b and the interior of the leaching pool below the septic tank, there being an access shaft 20b as before for the same purpose described above in connection with FIG. 1. the modification of FIGS. 7 to 9 further differs from the other forms of the invention in that the slab 21b is constructed as a plurality of segments as will be apparent from FIGS. 7 to 9. This has the advantage of enabling one or more segments to be moved or lifted off without removing the entire top slab.

I claim:

1. A septic tank construction comprising a leaching pool defined by a perforate wall sunk below ground level, a septic tank extending downwardly into the leaching pool and supported by the top of the leaching pool wall the inner wall of the leaching pool being spaced from the outer wall of the septic tank thereby exposing the entire height of the wall of the leaching pool to the pool contents, said tank having a diametrically disposed baffle wall and having an inlet discharging directly into the interior of the septic tank, and an outlet above the top of the leaching pool and connecting the interior of the septic tank with an access shaft communicating with the interior of the leaching pool, the inlet and outlet being close together and arranged to permit an elongated effluent flow path from one side of the tank to the other and then back, a removable slab on the tank having an aperture in registry with the access shaft and a removable cover closing said aperture, there being an airspace formed between the slab and the tank.

2. A septic tank construction according to claim 1, wherein the septic tank is of toroidal shape surrounding the access shaft.

3. A septic tank construction according to claim 1, wherein part of the effluent surrounds the septic tank which tapers downwardly to its bottom to form a generally triangular space between the wall of the septic tank and the inner surface of the leaching pool.

4. A septic tank construction according to claim 1, wherein the leaching pool wall is formed from sanitary drain rings shaped and arranged to provide vertically spaced rows of circumferential effluent slots.

5. A septic tank construction according to claim 1, wherein the bottom of the septic tank extends into the leaching pool wall and is apertured to connect the triangularly shaped space between the tank and the pool wall and the concrete slab is formed in segments.

* * * * *